No. 873,405.

PATENTED DEC. 10, 1907.

F. BARTL.
AUTOMOBILE.
APPLICATION FILED NOV. 30, 1906.

3 SHEETS—SHEET 1.

Witnesses

Inventor
Franz Bartl
By his Attorney

No. 873,405. PATENTED DEC. 10, 1907.
F. BARTL.
AUTOMOBILE.
APPLICATION FILED NOV. 30, 1906.
3 SHEETS—SHEET 2.
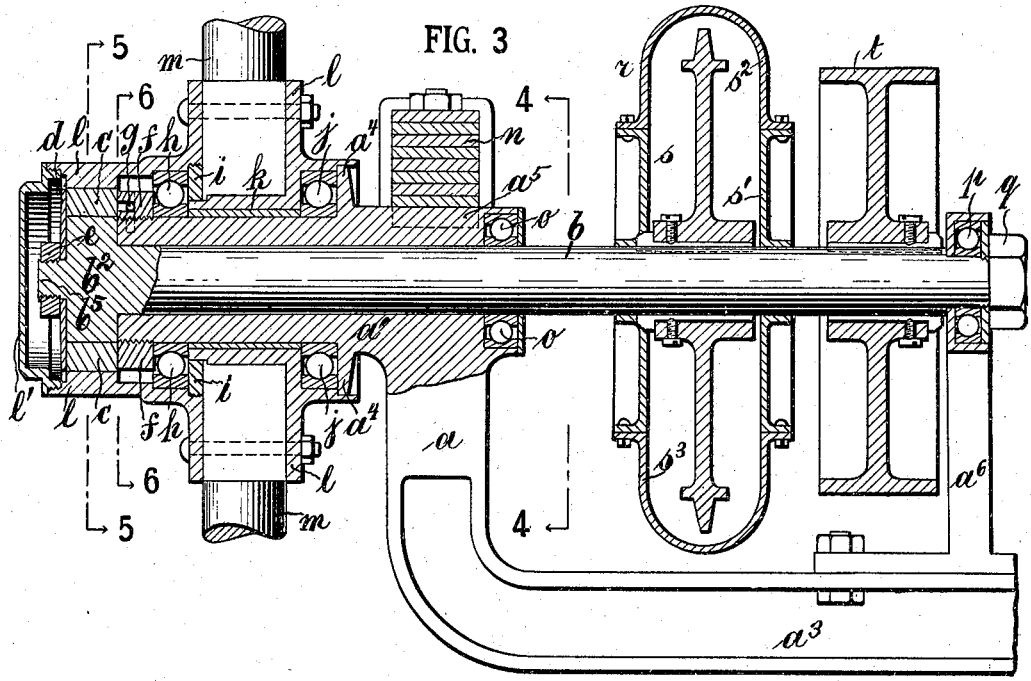
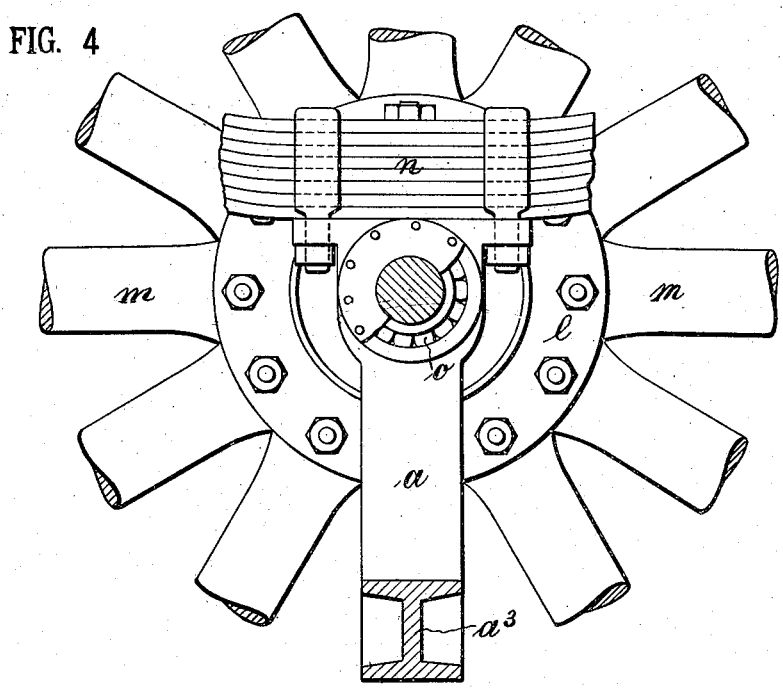
Witnesses
Max B. A. Doring.
Catherine M. Manning.
Inventor
Franz Bartl,
By his Attorney
L. K. Böhm.

No. 873,405. PATENTED DEC. 10, 1907.
F. BARTL.
AUTOMOBILE.
APPLICATION FILED NOV. 30, 1906.

3 SHEETS—SHEET 3.

Witnesses
Max B. A. Doring
Catherine M. Manning

Inventor
Franz Bartl
By his Attorney
L. K. Böhm

UNITED STATES PATENT OFFICE.

FRANZ BARTL, OF NEW YORK, N. Y.

AUTOMOBILE.

No. 873,405.  Specification of Letters Patent.  Patented Dec. 10, 1907.

Application filed November 30, 1906. Serial No. 345,589.

*To all whom it may concern:*

Be it known that I, FRANZ BARTL, a subject of the Emperor of Austria-Hungary, and a resident of New York, in the county and State of New York, have invented certain new and useful Improvements in Automobiles, of which the following is a specification.

This invention relates to improvements in automobiles and particularly to improvements in the axle which is made of one piece and curved so that its outer ends alone are in connection with the wheels.

The principal objects of the invention are to produce an automobile axle which may be used in connection with chain operated machines as well as with shaft machines. Each rear wheel turns on an end stump of the axle which supports a shaft extending inwardly. Accordingly there are two shafts one in connection with each wheel and said shafts end at a certain distance from the wheels leaving a free space between them. The construction of the axle renders it possible to locate all mechanism within the chassis frame with the exception of the springs. Thus the chains and chain wheels are located within said frame and the whole chain mechanism is surrounded by a casing filled with oil so that the chain mechanism runs in oil and is protected from dust and other exterior influences. The shafts of the shaft machine also run solely through the outer stumps of the axle, they end in the frame of the differential mechanism and are also interrupted. By the use of the novel axle any of the rear wheels may be taken directly off without disturbing any other part of the machine. All machine parts being within the chassis frame in chain operated machines the automobile looks like a private carriage and all parts are well protected.

The novel construction of the axle brings forth a number of improvements of the parts in and on the hub which will be fully described further down.

Figure 1:
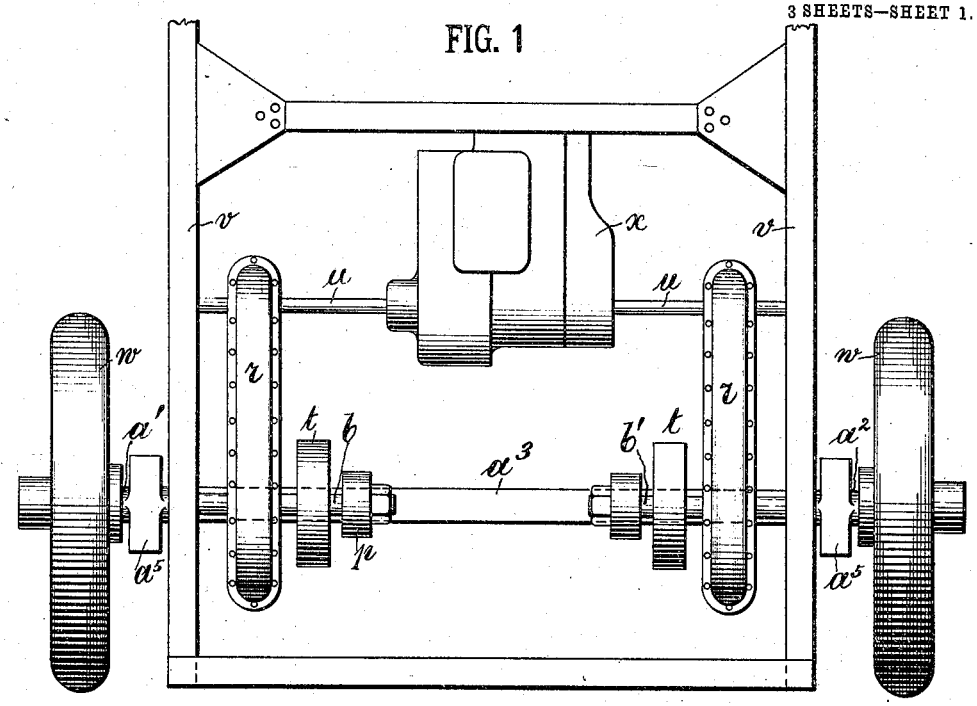
Figure 2:
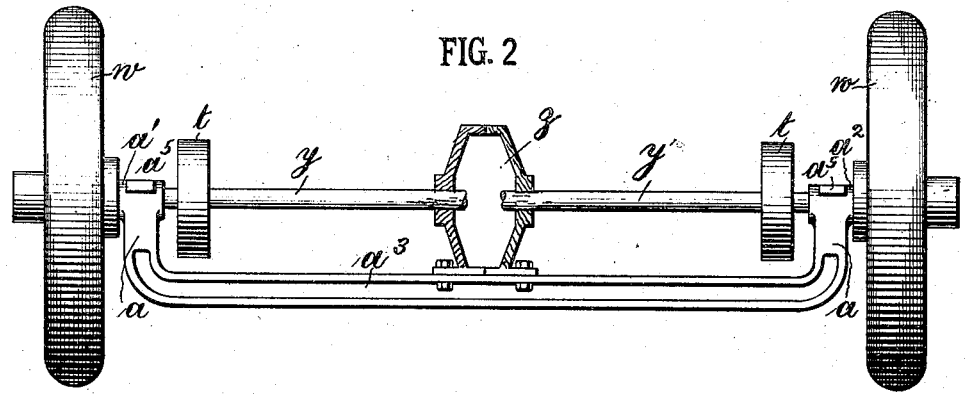
Figure 5:
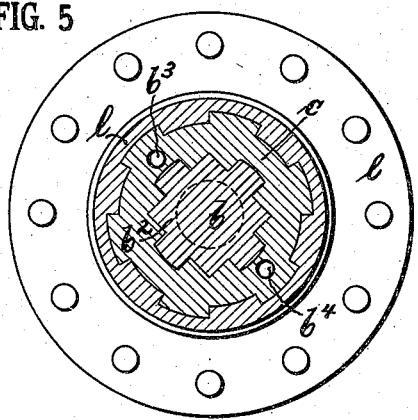
Figure 6:
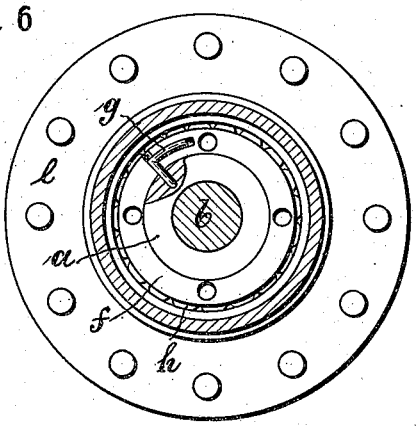
Figure 7:
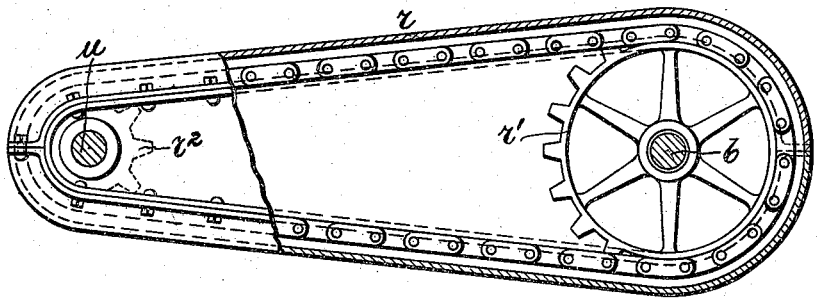

The invention further consists in the construction and arrangement of the single parts comprising the mechanism. It is illustrated in the accompanying drawings in which:

Figure 1 represents in top plan view the rear part of a motor vehicle mechanism which embodies in desirable form and arrangement the present improvements as applied to a chain operated mechanism. Fig. 2 illustrates in rear elevation the arrangement of the axle and other parts as applied to a shaft machine. Fig. 3 is a vertical section of the mechanism located on one axle stump and shaft. Fig. 4 is a cross section on line 4, 4 of Fig. 3. Fig. 5 is a cross section on line 5, 5 of Fig. 3. Fig. 6 is a cross section on line 6, 6 of Fig. 3, and Fig. 7 shows in side elevation the casing for the chain mechanism partly broken away.

Similar characters of reference denote like parts in all the figures.

In the drawings $a$ represents the axle whose side ends $a^1$, $a^2$ pass each through the hub of a wheel. At the inner ends of the short pieces or stumps of the axle same extend downward and horizontally across forming the part $a^3$ which is I shaped in cross section. The axle is made of one piece and all its parts are integral with each other. The stumps $a^1$, $a^2$ of the axle are hollowed out in order to receive each a shaft $b$, $b^1$.

The arrangement on both sides of the axle and in connection with each wheel is the same. Therefore I shall describe the construction of this mechanism solely with reference to one axle stump and shaft as shown in detail in Fig. 3.

The shaft $b$ extends through the axle stump $a^1$ inwardly and supports there a chain mechanism and brake. At its inner end it is supported by a standard $a^6$ which is riveted to the I shaped part $a^3$ of the axle. The end of the shaft is formed into a head $b^2$ the cross section of which is shown in Fig. 5. The head of the shaft is considerably larger in diameter than the shaft itself and its inner end rests against the front end of the axle. A ring $c$ is provided on the head of the shaft, it is cut out so as to closely fit the shape of the head of the shaft and therefore turns with same. The shape of the shaft head and ring has been selected as shown so as to present a number of surfaces, eight are preferably used, whereby the power from the shaft is transmitted to the ring in a uniform manner. Two holes $b^3$, $b^4$ are provided in the shaft head in which a tool is inserted when the ring $c$ is to be removed. At the outer end the shaft forms a short stem $b^5$ which is threaded and adapted to receive a washer $d$ and a nut $e$. On the axle there is an axle nut $f$ screwed to the threaded front end of the same. This nut $f$ is cut out to receive an almost rectangular pin $g$ which extends down into the axle and after being inserted is turned so as to fully secure said nut to the shaft. Next to the axle nut there is a ball bearing $h$ mounted on the axle and resting against a ring $i$. Another ball bearing $j$ is provided at the other side which is held in position by a flange $a^4$ of the shaft $a$. The two ball bearings are further kept in position by a ring $k$ located on the axle. The front end of the hub 1 is inside shaped as shown in Fig. 5 to fit the ring $c$ whereby the hub is connected to the ring $c$ and turns with same. The spokes $m$ are secured in the hub and the two described ball bearings are located on both sides of the spokes. Right behind the ball bearing $j$ there is provided on the axle a seat $a^5$ on which rests the spring $n$. Adjoining the spring $n$ there is a small ball bearing $o$ on the shaft $b$ and a like ball bearing $p$ is located at the end of the shaft held in position by a nut $q$. As seen from Fig. 3 the ball bearing $q$ is supported by a standard $a^6$ which is bolted to the axle part $a^3$.

Between the ball bearings $o$ and $p$ on the shaft $b$ there is secured the chain mechanism $r$ which is shown in detail in Fig. 7. The chain mechanism itself is of usual construction and does not require any detailed description save that the entire mechanism is inclosed in a casing $s$ which is divided into the principal part $s^1$ secured on the shaft and two caps $s^2$, $s^3$. The caps may be taken off by removing the connecting screws and the mechanism inside inspected in a very convenient manner. As above stated this casing is filled with oil and the wheels and chain run in oil whereby friction is lessened, overheating avoided and the mechanism is protected from dust etc.

Adjoining the chain mechanism is mounted the brake $t$ which is of usual construction and operated in the usual manner.

The chain wheel $r^1$ is secured on the shaft $b$ while the chain wheel $r^2$ is secured to a shaft $u$ which is supported in the chassis frame $v$ and runs into the casing $x$ which contains the differential mechanism.

It is plainly seen that the described construction and arrangement of the various parts composing the mechanism are very effective and practical because all the parts except the springs are located within the chassis frame by virtue of the described construction of the novel axle while in the present chain machines the chain mechanism is outside of the frame and can not be mounted within same. The shafts $b$, $b^1$ ending within the frame and leaving a free space renders it possible to turn sharp corners without danger of injuring the mechanism or breaking part of same.

In Fig. 2 the axle $a$ is shown as applied to a shaft machine, its end stumps likewise pass through the hub of the wheels and support the shafts $y$, $y^1$. The shafts end within the housing $z$ of the differential mechanism and also leaving a free space between extending in the casing just far enough to connect thereon the differential mechanism. Thus the same style of shaft is applicable to both kinds of motor vehicle mechanisms, the chain operated one as well as the shaft machines.

The power engine operates the differential mechanism whereby the shafts $u$ are turned rotating the chain wheels $r^2$ from where the chains transmit the power to the chain wheels $r^1$ revolving each a shaft $b$ whose head is connected with a ring $c$ which is connected to the hub whereby the wheels are turned on the stationary axle. The arrangement of the two sets of ball bearings on each side, one set composed of two ball bearings on the axle and one set composed of two ball bearings on the shaft insure a perfectly smooth running of the vehicle.

In the described manner I have produced a motor vehicle which is highly effective and not liable to get easily out of order because all the parts composing the actuating mechanism are located within the chassis frame save the seat for the spring itself. This desirable arrangement is rendered possible by virtue of the novel construction of my improved stationary axle.

Having thus described my invention I claim as new and desire to secure by Letters Patent:—

1. A motor vehicle or automobile in which the actuating mechanism is located within the chassis frame comprising a drop axle with a stump on each end passing through the hub of a wheel, borings in said stumps, a wheel shaft in each boring, a ball bearing on each side of the wheel on the axle stump, a third ball bearing on each shaft at the end of each axle stump, a fourth ball bearing at the inner end of each shaft, and a standard bolted to the drop axle supporting the last named ball bearing and the inner end of the shaft.

2. A motor vehicle or automobile comprising a drop axle with a stump at each end passing through the hub of a wheel, borings in said stumps, a wheel shaft in each boring, a ball bearing on each side of the wheel on the axle stump, a spring-seat with spring near the inner ball-bearing of the wheel, a third ball bearing on the shaft at the end of the axle stump, a chassis frame, a chain mechanism on the shaft located inside of the chassis frame, a brake on the shaft located inside of the chain mechanism, and a suitably supported fourth ball bearing on the inner end of the shaft.

3. A motor vehicle or automobile in which the actuating mechanism is located within the chassis frame comprising a drop axle with a stump on each end passing through the hub of a wheel, borings in said stumps, a shaft in each boring, and an enlarged head on each shaft forming a multiple of shoulders, a ring of conforming shape on said head, and a wheel hub whose inner part conforms in shape to said ring, two ball bearings on the stump on each side of the wheel, a third ball bearing on the shaft at the inner end of the stump, and a fourth ball bearing at the end of the shaft suitably supported on the drop axle.

4. A motor vehicle or automobile comprising a drop axle with a stump at each end passing through the hub of a wheel, borings in said stumps, a shaft in each boring and an enlarged head on each shaft forming a multiple of shoulders, a ring conforming in shape on said head and a wheel hub whose inner part conforms in shape to said ring, two ball bearings on the stump one on each side of the wheel, a spring-seat with spring near the inner ball bearing a third ball bearing on the shaft at the inner end of the stump, a chassis frame, a chain mechanism on the shaft, a brake near the inner end of the shaft, and a suitably supported ball bearing at the end of same.

5. In a motor vehicle or automobile a drop axle with a stump at each end, borings in said stumps, a wheel shaft in each boring, a chassis frame, a chain mechanism located within said frame on the shaft, and a casing around said chain mechanism adapted to be filled with oil.

Signed at New York, N. Y. this 28th day of November 1906.

FRANZ BARTL.

Witnesses:
LUDWIG K. BÖHM,
CATHERINE MANNING.